US008875792B2

(12) United States Patent
Whitelaw et al.

(10) Patent No.: US 8,875,792 B2
(45) Date of Patent: Nov. 4, 2014

(54) APPARATUS FOR AND METHOD OF PROTECTING AN UMBILICAL

(75) Inventors: Calum Whitelaw, Aberdeen (GB); Alan Craigie, Aberdeen (GB)

(73) Assignee: Polyoil Limited, Aberdeen (GB)

( * ) Notice: Subject to any disclaimer, the term of this patent is extended or adjusted under 35 U.S.C. 154(b) by 1306 days.

(21) Appl. No.: 12/663,403

(22) PCT Filed: Jun. 11, 2008

(86) PCT No.: PCT/GB2008/001977
§ 371 (c)(1),
(2), (4) Date: Feb. 2, 2011

(87) PCT Pub. No.: WO2008/152372
PCT Pub. Date: Dec. 18, 2008

(65) Prior Publication Data
US 2011/0154620 A1    Jun. 30, 2011

(30) Foreign Application Priority Data
Jun. 12, 2007 (GB) .................................. 0711291.5

(51) Int. Cl.
*E21B 17/10* (2006.01)
*F16L 3/237* (2006.01)
*F16L 3/22* (2006.01)

(52) U.S. Cl.
CPC ............. *E21B 17/1035* (2013.01); *F16L 3/237* (2013.01); *F16L 3/22* (2013.01); *E21B 17/105* (2013.01)
USPC .......................... 166/345; 166/367; 405/168.1

(58) Field of Classification Search
CPC ........................... E21B 17/1035; E21B 17/105
USPC ........ 166/345, 339, 360, 367, 378–380, 85.1, 166/241.6; 405/168.1, 168.2, 184.4; 24/122.6, 132 R; 138/111, 112; 285/124.2, 423; 248/74.1, 68.1
See application file for complete search history.

(56) References Cited

U.S. PATENT DOCUMENTS 3,002,241 A * 10/1961 Scurlock .................... 285/124.1
3,038,224 A    6/1962 Kulberg et al.
3,226,143 A    12/1965 Daughtrey
(Continued)

FOREIGN PATENT DOCUMENTS

| GB | 2123072 A | 1/1984 |
|---|---|---|
| GB | 2410965 A | 8/2005 |
| WO | WO 99/67499 A | 12/1999 |

OTHER PUBLICATIONS

International Preliminary Report on Patentability for Application PCT/GB2008/001977 (Dated Dec. 17, 2009).

*Primary Examiner* — Matthew Buck
(74) *Attorney, Agent, or Firm* — Flaster/Greenberg PC

(57) ABSTRACT

The present invention relates to apparatus for retaining at least one umbilical in relation to a string. The apparatus (30) comprises a body (32), first (38) and second members (40) and first (50, 52) and second fasteners. The body and the first member are movable in relation to each other between a first disposition, in which the body and the first member define a first bore (34) between them for accommodating a string, and a second disposition, in which the body and the first member are spaced apart from each other such that the string can be received in or removed from the first bore.

17 Claims, 5 Drawing Sheets

(56) References Cited

U.S. PATENT DOCUMENTS

| | | | |
|---|---|---|---|
| 3,664,621 A * | 5/1972 | Savoie, Jr. | 248/74.1 |
| 3,844,345 A * | 10/1974 | Evans et al. | 166/72 |
| 4,059,872 A * | 11/1977 | Delesandri | 24/284 |
| 4,068,088 A * | 1/1978 | Smith | 174/136 |
| 4,249,610 A * | 2/1981 | Loland | 166/360 |
| 4,437,791 A * | 3/1984 | Reynolds | 405/224.2 |
| 4,601,334 A * | 7/1986 | Lovegrove | 166/241.7 |
| 5,379,836 A * | 1/1995 | Jordan | 166/241.6 |
| 5,542,776 A * | 8/1996 | Reynolds | 403/389 |
| 5,730,554 A * | 3/1998 | Mosley et al. | 405/195.1 |
| 5,803,170 A * | 9/1998 | Garcia-Soule et al. | 166/242.3 |
| 6,023,027 A * | 2/2000 | Neff | 174/136 |
| 6,431,502 B1 * | 8/2002 | Goodman | 248/74.1 |
| 6,588,714 B2 * | 7/2003 | Blane et al. | 248/68.1 |
| 6,613,982 B1 * | 9/2003 | Kaland et al. | 174/74 A |
| 6,726,166 B2 * | 4/2004 | Goodman | 248/229.14 |
| 6,755,595 B2 * | 6/2004 | Oram | 405/216 |
| 7,398,697 B2 * | 7/2008 | Allen et al. | 73/800 |
| 7,431,535 B2 * | 10/2008 | Cupolillo | 405/184.4 |
| 7,614,593 B2 * | 11/2009 | McClure et al. | 248/229.14 |
| 7,861,982 B1 * | 1/2011 | McClure | 248/74.1 |
| 8,464,986 B1 * | 6/2013 | McClure | 248/74.1 |
| 2002/0096611 A1 | 7/2002 | Meuth et al. | |
| 2006/0115335 A1 * | 6/2006 | Allen et al. | 405/274 |

\* cited by examiner

APPARATUS FOR AND METHOD OF PROTECTING AN UMBILICAL

FIELD OF THE INVENTION

The present invention relates to apparatus for and a method of protecting at least one umbilical.

BACKGROUND TO THE INVENTION

Semi-submersible rigs are widely used in offshore oil and gas exploration and completion operations and in particular in deep sea environments where sea-bed supported rigs are impracticable. A typical semi-submersible rig comprises a slip jointed marine riser connecting the rig floor above sea level to the well-head on the sea floor. A landing/running string is deployed within the marine riser. During exploration and completion operations there is normally a need to control downhole equipment remotely from the rig floor, to convey measurements made downhole to the rig floor or to convey power to the well-head. Communication between downhole equipment and the rig floor is normally by electrical or hydraulic links that run within the marine riser. Communication between the rig floor and well-head may involve many such electrical and hydraulic links. Thus, the electrical and hydraulic links are often bundled together and sheathed in a rugged material. Such a sheathed bundle of links is termed an umbilical within the oil and gas industry.

An umbilical contains links that are liable to sustain damage, in particular as the semi-submersible rig rises and falls with the tide and seas on its slip-jointed marine riser. Thus, it is desirable to provide some form of protection for the umbilical. It is known in the oil and gas industry to use cable protectors, such as those described in GB 2377717. Such known cable protectors have a cylindrical hinged body that clamps one or more cables to the landing/running string.

The present inventor has appreciated that known arrangements for protecting cables, such as those of GB 2377717, present problems when applied to protecting an umbilical.

It is an object of the present invention to provide apparatus for protecting an umbilical.

It is a further object to provide apparatus for protecting an umbilical when used with a landing/running string, e.g. in a sub-sea oil or gas exploration or recovery procedure.

STATEMENT OF INVENTION

The present invention has been devised in view of problems with known approaches to cable protection. Thus according to a first aspect of the present invention, there is provided apparatus for retaining at least one umbilical in relation to a string, the apparatus comprising: a body, first and second members and first and second fasteners; the body and the first member being movable in relation to each other between a first disposition, in which the body and the first member define a first bore between them for accommodating a string, and a second disposition, in which the body and the first member are spaced apart from each other such that the string can be received in or removed from the first bore, the first fastener being operative to hold the body and the first member in the first disposition; and the body and the second member being movable in relation to each other between a first disposition, in which the body and the second member define a second bore between them for accommodating an umbilical, and a second disposition, in which the body and the second member are spaced apart from each other such that the umbilical can be received in or removed from the second bore, the second fastener being operative to hold the body and the second member in the first disposition.

In use, the body and the first member may, for example, be put in the second disposition and the apparatus fitted around the string by moving the string into the first bore. Then the body and the first member may be put in the first disposition to resist removal of the string from the first bore and thus the apparatus from the string. When the body and the first member are in the first disposition and the body and the second member are in the second disposition, an umbilical may be moved into the second bore. Then the body and the second member may be put in the first disposition such that the umbilical is held in its bore. Using the apparatus in this fashion to retain an umbilical in relation to a string may provide protection for the umbilical by retaining the umbilical in a desired position during its use. For example, retaining the umbilical in relation to the string may reduce the likelihood of the umbilical becoming snagged on or worn by other components or being compressed unduly (e.g. against the marine riser inner surface) as the semi-submersible rig moves.

Alternatively, the apparatus may be used by moving the umbilical into the second bore when the body and second member are in the second disposition. Then the body and the second member may be put in the first disposition to hold the umbilical in the second bore. When the body and first member are in the second disposition, the apparatus may be fitted around the riser by moving the riser into the first bore. Then the body and first member may be put in the first disposition to hold the riser in the first bore.

Use of the apparatus, whatever the method of use employed, provides for retention of an umbilical in relation to a string. The apparatus can provide for ease of use. More specifically, having the ability to move one of the string and the umbilical into its respective bore and then to hold the moved component whilst the other of the string and the umbilical is moved into its respective bore provides for ease of use of the apparatus. Known apparatus normally requires a string and an umbilical to be moved into their respective bores at the same time before the string and umbilical are retained in the respective bores. The moving of the string and umbilical into their respective bores at the same time can be difficult. This is because an umbilical is normally inflexible compared, for example, with a cable, thus making it difficult to manoeuvre the umbilical into the second bore while the apparatus is held with the string received in the first bore. Furthermore, after the umbilical is moved into the second bore the inflexibility of the umbilical can make it difficult to keep the umbilical in the second bore whilst the apparatus is held with the string in the first bore and when the configuration of the apparatus is being changed from the second disposition to the third disposition. In addition, apparatus according to the present invention may provide for a reduction in installation time and for an improvement in safety for personnel using the apparatus.

More specifically, the body and first member may be movable between the first and second dispositions when the body and the second member are held in the first disposition by the second fastener and the body and second member may be movable between the first and second dispositions when the body and the first member are held in the first disposition by the first fastener.

Alternatively or in addition, the body may comprise at least one arcuate surface defining a part of a respective one of at least one of the first and second bores. Alternatively or in addition, the first member may comprise an arcuate surface defining a part of the first bore.

Alternatively or in addition, the second member may comprise an arcuate surface defining a part of the second bore.

Alternatively or in addition, the body and the first member may move rotatably between the first and second dispositions. More specifically, the apparatus may comprise a hinge operative to provide for rotation of the body and the first member in relation to each other.

Alternatively or in addition, in which the body and the second member may move rotatably between the first and second dispositions. More specifically, the apparatus may comprise a hinge operative to provide for rotation of the body and the second member in relation to each other.

Alternatively or in addition, each of the first and second members may be rotatable in relation to the body. More specifically, the first member may be rotatable about a first axis and the second member may be rotatable about a second axis, the first and second axes being spaced apart from each other in a direction substantially perpendicular to a longitudinal axis of the first bore. More specifically, the first and second axes may be substantially parallel to each other.

Alternatively or in addition, the first and second axes may be disposed on opposing sides of a longitudinal axis of the first bore.

Alternatively or in addition, a free edge of the first member and a free edge of the second member may move in generally opposing directions.

Alternatively or in addition, longitudinal axes of the first and second bores may be substantially parallel.

Alternatively or in addition, the apparatus may further comprise a third member and a third fastener, the first member and the third member being movable in relation to each other between a first disposition, in which the first member and the third member define a further bore between them for accommodating a further umbilical, and a second disposition, in which the first member and the third member are spaced apart from each other such that the further umbilical can be received in or removed from the further bore, the third fastener being operative to hold the first member and the third member in the first disposition.

More specifically, the first and third members may be movable between the first and second dispositions when at least one the first and second fasteners are operative to hold the body and a respective one of the first and second members in the first disposition.

Alternatively or in addition, the body and the first member may define a further bore between them for accommodating a further umbilical, the further umbilical being accommodated in the further bore in the first disposition and the further umbilical being receivable in or removable from the further bore in the second disposition.

More specifically, the body and the first member may be rotatable in relation to each other and an axis of rotation of the body and the first member is substantially in line with a centre of the first bore and a centre of the further bore.

Further embodiments of the first aspect of the present invention may comprise one or more features of any other aspect of the present invention.

According to a second aspect of the present invention, there is provided apparatus for retaining at least one umbilical in relation to a string, the apparatus defining a plurality of bores, a first of the plurality of bores being configured to receive a string and a second of the plurality of bores being configured to receive an umbilical, the apparatus being configurable to have at least three different dispositions: in a first disposition the apparatus being configured to allow at least one of the string and the umbilical to be moved into its respective bore; in a second disposition the apparatus being configured to resist removal of one of the string and the umbilical from its respective bore and to allow the other of the string and the umbilical to be moved into its respective bore; and in a third disposition the apparatus being configured to resist removal of the string and the umbilical from their respective bores.

More specifically, the apparatus may be configurable such that in the first disposition one of the string and the umbilical can be received in its respective bore.

More specifically, the apparatus may be configurable to have a fourth, different disposition in which each of the string and the umbilical can be received in its respective bore.

Alternatively or in addition, the apparatus may be configured for release of a component (i.e. a string or umbilical) for which removal is resisted in one of the second and third dispositions.

Alternatively or in addition, the apparatus may comprise a body which defines the first bore in part and the second bore in part.

More specifically, the apparatus may comprise a first member and a second member, the first member defining the first bore in part and the second member defining the second bore in part.

More specifically, the first and second members may be movable independently of each other in relation to the body. Thus, the first member may be moved in relation to the body between a first disposition in which the first member and the body together define the first bore, which presents resistance to removal of a string received therein and a second disposition in which a string can be moved between the first member and the body such that the string is received in the first bore defined by the first member and the body when they are in the first disposition. In addition, the second member may be moved between two dispositions, for example, when the string has been received in the first bore and the first member is in the first disposition. More specifically, the second member may be moved in relation to the body between a first disposition in which the second member and the body together define the second bore, which presents resistance to removal of an umbilical received therein and a second disposition in which an umbilical can be moved between the second member and the body such that the umbilical is received in the second bore defined by the second member and the body when they are in the first disposition.

In a first form, the apparatus may comprise a body defining each of the first and second bores in part. More specifically, the apparatus may comprise first and second members, each of the first and second members being movable independently of each in relation to the body, the first member defining along with the body the first bore, and the second member defining along with the body the second bore. More specifically, each of the first and second members may be pivotable in relation to the body. More specifically, the first member may pivot about a first axis and the second member may pivot about a second axis, the first axis and second axes being spaced apart from each other in a direction perpendicular to a longitudinal axis of a bore of the apparatus. More specifically, the first axis and second axes may be spaced apart from each other in a direction perpendicular to a longitudinal axis of the first bore of the apparatus.

Alternatively or in addition, at least one of the first axis and the second axis may be disposed laterally of a longitudinal axis of a bore (e.g. the first bore) of the apparatus.

Alternatively or in addition, the apparatus may be configured such that a first plane and a second plane are spaced apart from each other, the first plane passing through a centre of the first bore and the second plane passing through a centre of the second bore, the first and second planes being parallel to each other.

Alternatively or in addition, the first bore may be substantially circular in cross section.

Alternatively or in addition, the second bore may be configured to receive an elongate component in addition to an umbilical. For example, the second component may be another umbilical or a cable. More specifically, the second bore may be configured to receive an elongate component of smaller diameter than the umbilical.

Alternatively or in addition, a main part of the first bore that is configured to receive the umbilical may have a substantially circular footprint when the apparatus is viewed by looking along the second bore.

More specifically, a secondary part of the first bore that is configured to receive the elongate component may define a channel formed in a side of the main part of the first bore.

Alternatively or in addition, the apparatus may define an elongate footprint when the apparatus is viewed by looking along the first bore.

More specifically, the apparatus may be elongate in a direction along which a longitudinal axis of the first bore and a longitudinal axis of the second bore are spaced apart from each other.

In a second form, the apparatus may comprise a first body portion and a second body portion disposed in relation to each other to define at least one bore. More specifically, the first and second body portions may define the first bore. More specifically, the first and second body portions may define a further bore configured to receive a second umbilical.

Alternatively or in addition, the first and second body portions may be movable in relation to each other between a first disposition, in which one of a string and an umbilical can be moved into the bore, and a second disposition, in which removal from the bore of the one of the string and the umbilical received in the bore is resisted.

More specifically, the first and second body portions may be pivotably movable in relation to each other. More specifically, the arrangement may comprise a portion hinge to provide for rotation of the first and second body portions in relation to each other.

Alternatively or in addition, the first and second body portions may be pivotable about an axis substantially parallel to a longitudinal axis of the bore defined by the first and second body portions.

Alternatively or in addition, where the first and second body portions define a further bore configured to receive a second umbilical, movement of the first and second body portions between their first and second dispositions provides for movement into the further bore of a second umbilical in the first disposition and resistance to removal of the second umbilical from the further bore in the second disposition.

More specifically and where the first and second body portions rotate in relation to each other, an axis of rotation of the first and second body portions may be substantially in line with a centre of the first bore and a centre of the second bore when the first and second body portions are in their second disposition.

Alternatively or in addition, the first body portion may define the second bore in part. More specifically, the apparatus may comprise a member that defines the second bore with the first body portion.

Alternatively or in addition, the second body portion may define a further bore in part. More specifically, the apparatus may comprise a second member that defines the further bore with the first body portion, the member that defines the second bore being the first member.

Alternatively or in addition, a member may be rotatable in relation to its respective body portion, e.g. by means of a hinge.

Alternatively or in addition, the apparatus may, when in the third disposition, have a substantially circular footprint when the apparatus viewed by looking along the first bore. More specifically, a first part of the apparatus defining one side of the first bore may be substantially thicker than a second part defining an opposing side of the first bore. Thus, where the first bore is substantially circular in cross section, a centre of the first bore may be spaced apart from a centre of the circular footprint of the apparatus.

More specifically, at least the second bore may be defined in the first part of the apparatus.

Alternatively or in addition, where the first and second body portions are rotatable in relation to each other, the apparatus may comprise a hinge disposed towards the second part of the apparatus.

Alternatively or in addition, the apparatus may be configured for a user to manually change from one disposition of the apparatus to another disposition.

Alternatively or in addition, the apparatus may comprise at least one fastener. More specifically, the apparatus may be configured such that the at least one fastener is operable to retain the apparatus in the third disposition. More specifically, the at least one fastener may be operable to allow the configuration of the apparatus to be changed from the third disposition to one of the first and second dispositions.

Alternatively or in addition, the apparatus may comprise at least two fasteners, a first fastener being operable to configure the apparatus to resist removal of the string from the first bore and to allow the configuration of the apparatus to be changed to allow the string to be removed from the first bore. More specifically, a second fastener may be operable to configure the apparatus to resist removal of the umbilical from the second bore and to allow the configuration of the apparatus to be changed to allow the umbilical to be removed from the second bore.

Alternatively or in addition, the fastener may comprise a first fastener member and a second fastener member, the first and second fastener members being configured to releasably engage with each other. More specifically, the first fastener member may comprise an elongate member and a head portion, the head portion being movable along the elongate member. For example, the head portion and the elongate member may threadedly engage with other. Thus, an effective length of the first fastener member may be changed.

More specifically, the second fastener member may comprise a profile shaped to engage with the head portion of the first member. Where the profile is formed in a plastics material, the plastics material may spread a force exerted on the profile by the head portion of the first member.

Alternatively or in addition, where the apparatus comprises a body and a member movable in relation to the body, the first fastener member may be attached to the body and the second fastener member may be comprised as part of the member. More specifically, the first fastener member may be movable on the body. Thus, the first fastener member may be brought into engagement with the second fastener member. More specifically, where the first fastener member comprises an elongate member and a head portion, an end of the elongate member may be rotatably attached to the body.

Alternatively or in addition, a bore defined by the apparatus may be of substantially circular cross section. Alternatively or in addition, a bore defined by the apparatus may be of substantially a same width along the bore. Alternatively or in addition, the first bore may be configured to form a snug fit around a string. Alternatively or in addition, the first bore may be configured to grip a string.

Alternatively or in addition, the apparatus may define a plurality of irregularities on a surface of a bore. Such irregularities may enable the apparatus to grip the string or umbilical received in the bore. More specifically, the irregularities may be defined along only part of the bore.

Alternatively or in addition, the irregularities may be formed on the surface of the bore such that irregularities extend entirely around a longitudinal axis of the bore.

Alternatively or in addition, the irregularities may comprise a plurality of ridges. More specifically, the ridges may be spaced apart from one another along a longitudinal axis of the bore.

Alternatively or in addition, the apparatus may be formed at least in part of a plastics material. Use of a plastics material may provide for a lighter apparatus compared with, for example, a metal material. Thus, use of a plastics material may provide for greater freedom in design of apparatus according to the invention. Also, larger apparatus according to the invention may be formed. For example, such larger apparatus may receive a greater length of string and umbilical. Furthermore, a plastics material may provide for absorbance of the energy of impacts to apparatus according to the present invention. In addition, a plastics material tends to require less maintenance than a metal material, in particular where the apparatus according to the present invention is used in the presence of sea water. More specifically, the plastics material may comprise a thermoplastic plastics material. More specifically, the plastics material may comprise a thermoplastic polyamide, such as Nylon®.

Alternatively or in addition, the apparatus may be formed at least in part of a sacrificial material. In use, a sacrificial material may be liable to wear away in preference to a material (such as metal or concrete) of a body with which the apparatus comes into contact.

Alternatively or in addition, the plastics material may comprise a buoyancy material, which is positively buoyant in a fluid. More specifically, the fluid may comprise at least one of: a salt solution, such as sea water; a drilling fluid; and a completion fluid. More specifically, the buoyancy material may comprise particulates dispersed through at least part of the plastics material.

Alternatively or in addition, the buoyancy material may comprise glass beads. More specifically, the glass beads may be hollow.

Further embodiments of the second aspect of the present invention may comprise one or more features of any other aspect of the present invention.

According to a third aspect of the present invention, there is provided oil or gas exploration or recovery apparatus comprising apparatus according to the first aspect of the present invention.

More specifically, the oil or gas exploration or recovery apparatus may comprise a semi-submersible rig. Alternatively or in addition, the oil or gas exploration or recovery apparatus may comprise a marine riser.

Further embodiments of the third aspect of the present invention may comprise one or more features of any other aspect of the present invention.

According to a fourth aspect of the present invention, there is provided a method of retaining at least one umbilical in relation to a string using retaining apparatus, the retaining apparatus defining a plurality of bores, a first of the plurality of bores being configured to receive a string and a second of the plurality of bores being configured to receive an umbilical, the retaining apparatus being configurable to have at least three different dispositions, the method comprising: putting the retaining apparatus in a first disposition in which at least one of the string and the umbilical can be moved into its respective bore; putting the retaining apparatus in a second disposition in which removal of one of the string and the umbilical from its respective bore is resisted and the other of the string and the umbilical can be moved into its respective bore; and putting the retaining apparatus in a third disposition in which removal of the string and the umbilical from their respective bores is resisted.

Embodiments of the fourth aspect of the present invention may comprise one or more features of any other aspect of the present invention.

BRIEF DESCRIPTION OF THE DRAWINGS

Further features and advantages of the present invention will become apparent from the following specific description, which is given by way of example only and with reference to the accompanying drawings, in which.

SPECIFIC DESCRIPTION

Figure 1:
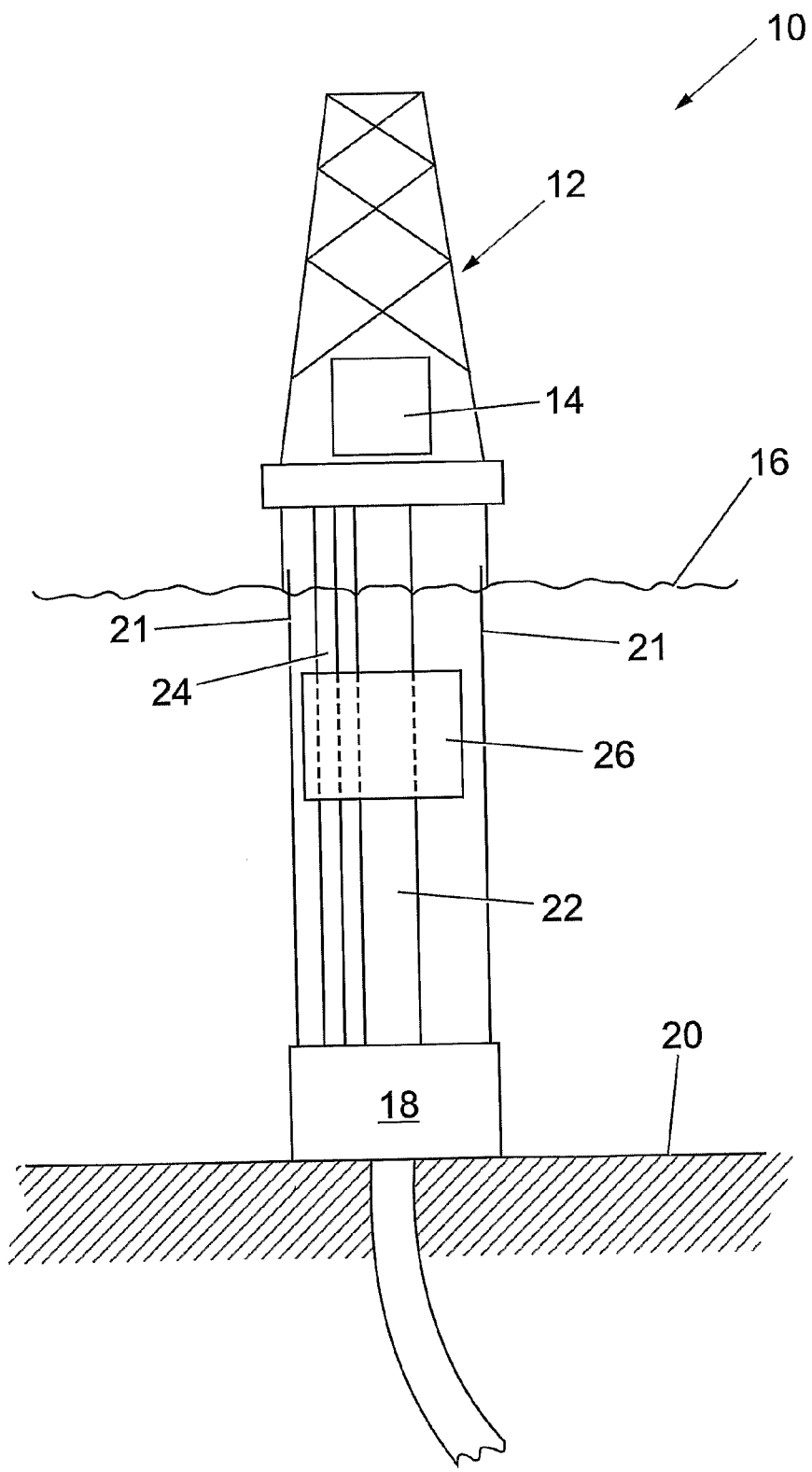
FIG. 1 shows a semi-submersible rig in use.

FIG. 1 shows semi-submersible rig 10 in use during an off-shore oil or gas exploration or completion procedure. The semi-submersible rig 10 comprises a rig platform 12 having a rig floor 14, which floats above the ocean surface 16, and a well-head 18 located on the sea floor 20. As will be familiar to those skilled in the art, the well-head 18 provides access below the sea floor, for example, to a reservoir of gas or oil that is undergoing exploration or completion. The rig floor 14 and the well-head 18 are connected by a slip jointed marine riser 21 within which is run whatever landing/running string arrangement 22 is needed for the oil or gas exploration or completion procedure. The length of the slip jointed marine riser 21 changes to accommodate the rises and falls experienced by the rig floor 14 as it floats on the ocean surface 16. Communication between electrical and hydraulic equipment in the rig platform 12 and in the well-head 18 is by way of an umbilical 24, which runs inside the marine riser 21.

The umbilical 24 comprises a number of electrical cables and hydraulic lines bundled together and sheathed in a rugged pliable material. There can be a tendency for the umbilical 24 to move on the current, snag or be compressed and thereby sustain damage. Hence, the umbilical 24 is retained in relation to the string 22 by at least one retaining apparatus 26. In addition, the retaining apparatus can help support the weight of the umbilical and thereby prevent damage that might otherwise be sustained.

Figure 2A:
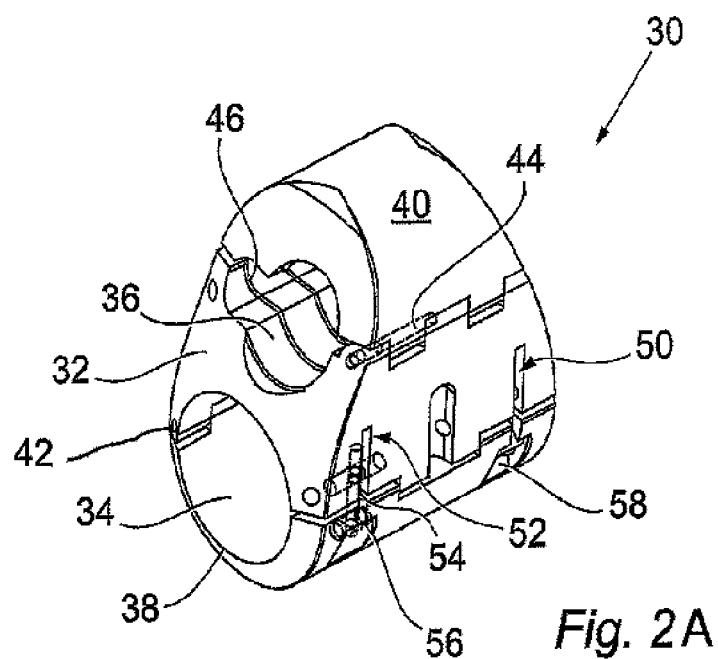
FIG. 2A is a perspective view of a first embodiment of apparatus according to the present invention.
Figure 2B:
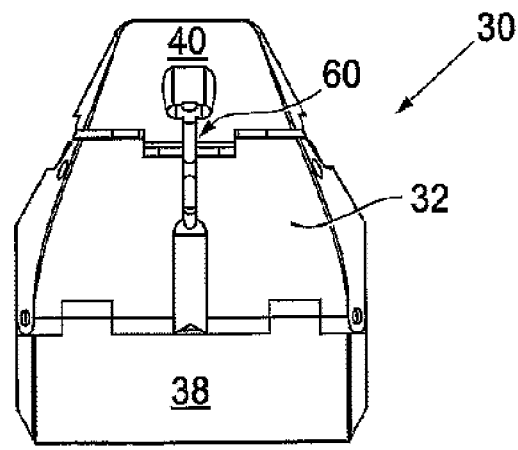
FIG. 2B is a side view of the apparatus of FIG. 2A.
Figure 2C:
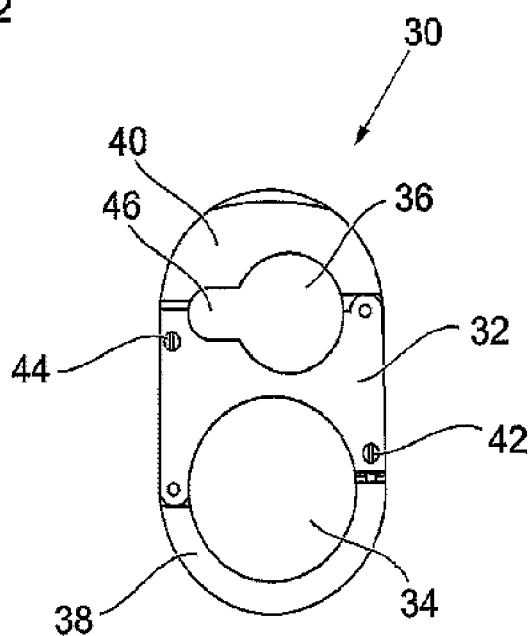
FIG. 2C is an end view of the apparatus of FIG. 2A.

FIGS. 2A to 2C provide different views of a first embodiment of the retaining apparatus shown in FIG. 1. FIG. 2A provides a perspective view of the retaining apparatus 30; FIG. 2B provides a side view of the retaining apparatus 30; and FIG. 2C provides an end view of the retaining apparatus 30. The retaining apparatus 30 comprises a body 32 that defines each of a first bore 34 and a second bore 36 in part. The retaining apparatus also comprises a first member 38, which defines the first bore 34 along with the body 32, and a second member 40, which defines the second bore 36 along with the body 32. The first bore 34 is of such a shape and size that it can fit around the string 22 shown in FIG. 1. The second bore 36 is of such a shape and size that it can fit around the umbilical 24 shown in FIG. 1. Each of the first and second members 38, 40 is connected to the body 32 by a hinge 42, 44 such that the member is pivotable in relation to the body 32. Thus, the first member 38 pivots about a first axis and the second member 40 pivots about a second axis, with the hinges 42, 44 being provided on the retaining apparatus 10 such that the first and second axes are parallel to each other and to a longitudinal axis of the first bore 34. Also, the first and second axes are spaced apart from each other in a direction perpendicular to the longitudinal axis of the first bore 34.

As can be seen from FIG. 2C the hinges 42, 44 are disposed on opposing sides of the first bore 34 and thus laterally of the longitudinal axis of the first bore 34. Furthermore, the first and second bores 34, 36 are of circular cross-section with their longitudinal axes being parallel to each other. The centres of the first and second bores 34, 36 are offset from each other in a direction laterally of the longitudinal axis of the first bore such that a first plane passing through the centre of the first bore 34 is spaced apart from a second plane passing though the centre of the second bore 36 when the first and second planes are parallel to each other.

The second bore 36 as defined by the second member 40 and the body 32 is shaped to receive an elongate component, such as a further umbilical or cable, in addition to the already mentioned umbilical. The body 32 and second member 40 are shaped such that a channel 46 is formed in a side of the second bore 36. The channel 46 is of a shape and size to accommodate the further umbilical or cable.

As can be seen from FIG. 2A, the first member 38 is fastened to the body 32 by means of two fasteners 50, 52 spaced apart along the longitudinal axis of the first bore. Each of the two fasteners 50, 52 comprises an elongate member 54 which is pivotally attached at one end to the body 32. A head portion 56 threadedly engages with the elongate member 54 such that the head portion can be moved along a length of the elongate member 54.

The head portion 56 is shaped such that when it is in engagement with the elongate member 54 it extends laterally of the elongate member 54. Each fastener further comprises a profile 58 shaped to engage with the head portion 56; the profile 58 is formed in the first member 38. Thus, moving the head portion 56 on the elongate member 54 determines how tightly the first member 38 is fastened to the body 32 when the head portion 56 is received in the profile 58.

As can be seen from FIG. 2B, the second member 40 is fastened to the body 32 by means of a fastener 60. The fastener 60 for fastening the second member 40 to the body 32 is of the same form and function as the fasteners 52 described in the immediately preceding paragraph with reference to FIG. 2A.

The retaining apparatus 30 of FIGS. 2A to 2C is formed of Nylon®. Glass beads (not shown) are present within the Nylon® material of the apparatus to make the retaining apparatus 30 positively buoyant in sea water. The elongate members 54 and head portions 56 of the fasteners 52, 60 are formed of an appropriate metal.

The surface of each of the first bore 34 and the second bore 36 has a plurality of ridges (not shown in the case of the first bore) spaced apart from each other and running around the circumference of the bore. The ridges provide for improved grip of a string or an umbilical by the retaining apparatus 30.

Figure 3A:
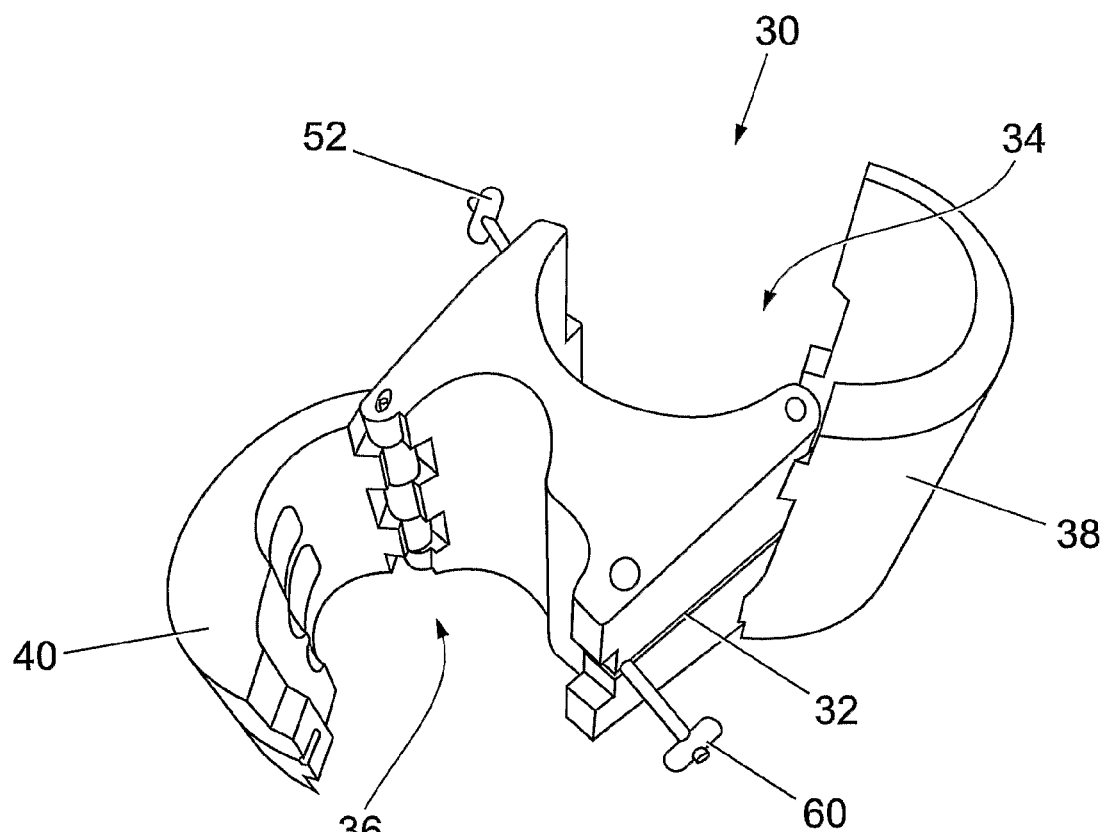
FIG. 3A is a perspective view of the apparatus of FIG. 2A when in the first disposition.
Figure 3B:
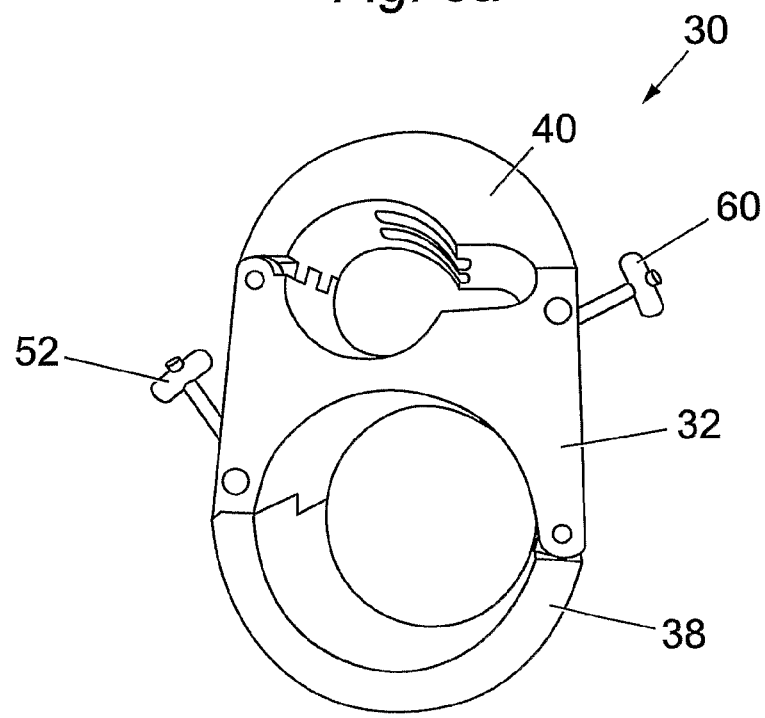
FIG. 3B is a perspective view of the apparatus of FIG. 2A when in the third disposition.

Turning now to FIGS. 3A and 3B the retaining apparatus 30 of FIGS. 2A to 2C is shown in different dispositions. In FIG. 3A, the retaining apparatus 30 is configured such that all the fasteners 52, 60 are unfastened and each of the first and second members 38, 40 are pivoted on their respective hinges away from the body 32. This constitutes a first disposition of the retaining apparatus 30, in which a string and an umbilical can be received in its respective bore. In use, the retaining apparatus 30 would be moved by a user so that a string is received in the first bore 34. When this movement is accomplished, the first member 38 is pivoted on its hinges towards the body 32 and the fasteners 52 used to fasten the first member 38 to the body 32, whereby the retaining apparatus is attached to the string. Then, the umbilical is moved into the second bore 36. This constitutes the second disposition, in which removal of the string from the first bore 34 is resisted and in which the umbilical can be moved into the second bore 36. Then, the second member 40 is pivoted on its hinge towards the body 32 and the fastener 60 used to fasten the second member 40 to the body 32. This constitutes the third disposition as shown in FIG. 3B and in which removal of the string and of the umbilical from their respective bores is resisted.

Figure 4A:
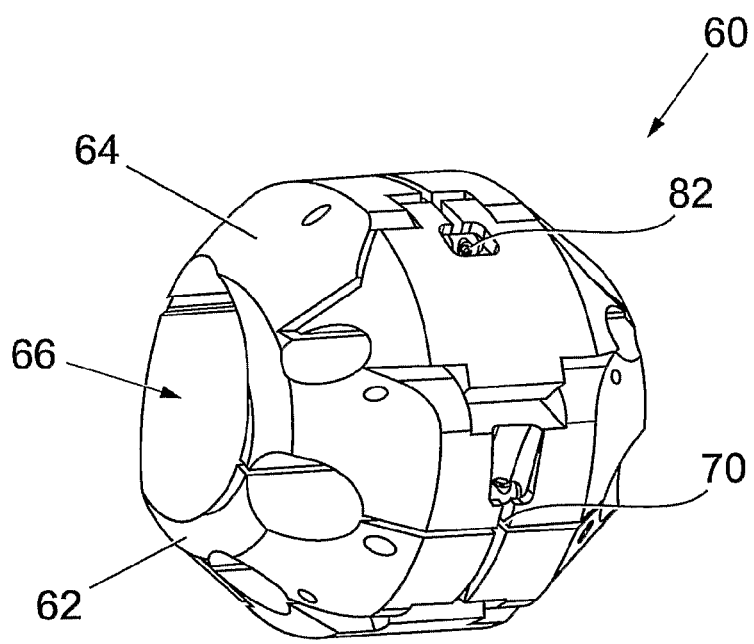
FIG. 4A is a perspective view of a second embodiment of apparatus according to the present invention.
Figure 4B:
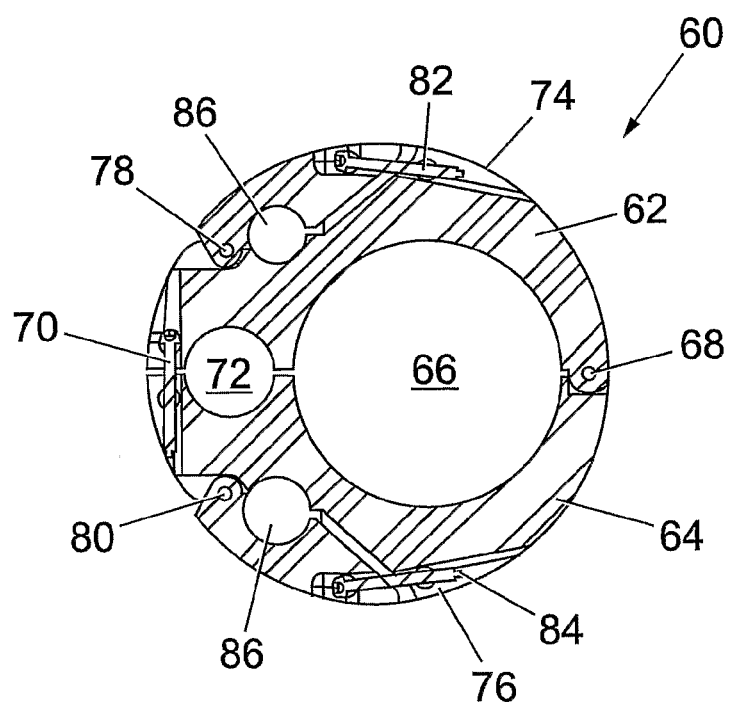
FIG. 4B is a cross sectional view of the apparatus of FIG. 4A.

FIGS. 4A to 4B show a second embodiment of retaining apparatus according to the present invention. The second embodiment is the same as the first embodiment as regards its form and function except as described below. Accordingly, the reader's attention is directed to the description given above of the first embodiment.

Figure 4C:
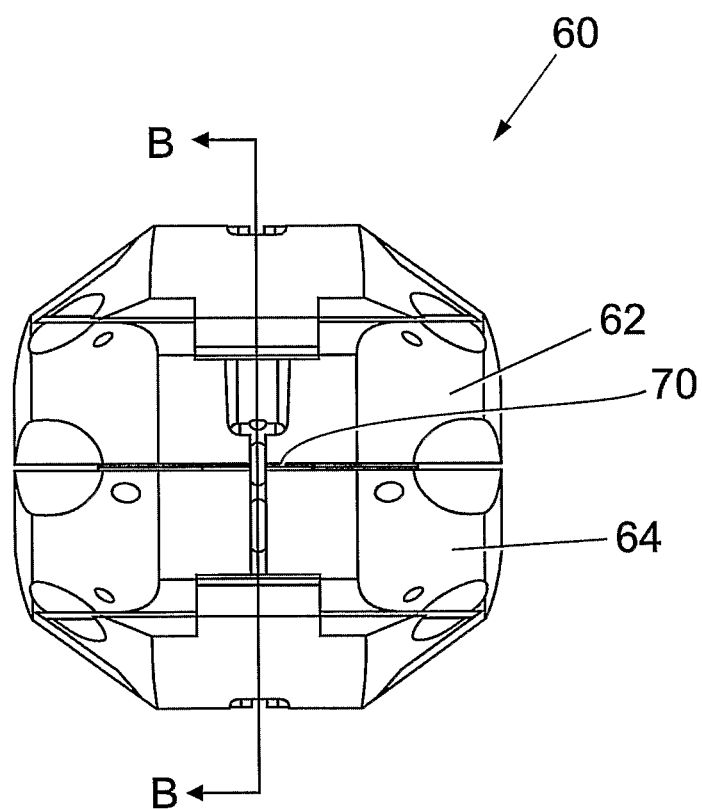
FIG. 4C is a side view of the apparatus of FIG. 4A.

Considering FIGS. 4A to 4C in more detail: FIG. 4A provides a perspective view of the second embodiment; FIG. 4B provides a cross-sectional view through the second embodiment; and FIG. 4C provides a side view of the second embodiment. The retaining apparatus 60 of FIGS. 4A to 4C comprises a first body portion 62 and a second body portion 64, which together define the first bore 66. The first and second body portions 62, 64 are pivotable in relation to each other about a portion hinge 68, whereby the first and second body portions can be pivoted apart from each other to admit a string to the first bore 66. The first and second body portions pivot about an axis that is parallel to a longitudinal axis of the first bore and spaced apart from and in line with a centre of the first bore. The first and second body portions 62, 64 are fastened to each other by means of a fastener 70, which is of the same form and function as the fasteners of the first embodiment described above. The first and second body portions 62, 64 also define a further bore 72, which is configured to receive a second umbilical or cable when the first and second body portions are pivoted apart from each other.

The retaining apparatus 60 of FIGS. 4A to 4C also comprises first and second members 74, 76, each of which is pivotable in relation to a respective body portion 62, 64 of the retaining apparatus 60. Each of the first and second members 74, 76 is pivotable about a respective hinge 78, 80 and defines along with its respective body portion a second bore 86. Thus, amongst the two second bores 86 and the further bore 72 the retaining apparatus 60 is capable of receiving three umbilicals and retaining them in relation to a string received in the first bore 66. Each of the first and second members 74, 76 is fastened to a respective body portion 62, 64 by means of a respective fastener 82, 84 of a form and function as described above in relation to the first embodiment. Pivoting of each of the first and second members 74, 76 apart from its respective body portion 62, 64 allows an umbilical to be received in its respective bore.

As can be seen from FIG. 4B, the retaining apparatus 60 has a circular footprint, with a first side of the first and second body portions being thicker than an opposing, second side of the first and second body portions such that the first bore is offset from a centre of the retaining apparatus. The two second bores 86 and the further bore 72 are formed within the first, thicker side of the body portions.

The embodiment of FIGS. 4A to 4C is used in the same fashion as the embodiment of FIGS. 2A to 2C. Thus, the reader's attention is directed to the description of the use of the first embodiment given above with reference to FIGS. 3A and 3B. In summary, the second embodiment can be put in a first disposition in which the first and second body portions 62, 64 are pivoted apart and a string moved into the first bore 66 before the first and second body portions are fastened together. Then, when the apparatus is in a second disposition at least one of the first and second members 74, 76 is pivoted away from its respective body portion and an umbilical moved into the second bore 86. Then, the apparatus is put in the third disposition by fastening the first and second members 74, 76 to its respective body portion, whereby resistance is presented to removal of the string and the at least one umbilical from its respective bore.

The invention claimed is:

1. An umbilical protector for retaining at least one umbilical in relation to a landing/running string, the umbilical protector being formed substantially of a plastics material and comprising:
    a body, first and second members and first and second fasteners;
    the body being formed as one piece and integrally molded, the body defining a first bore portion and a separate second bore portion,
    the body and the first member pivotally attached and being rotatably movable in relation to each other between a first disposition, in which the body and the first member define a first bore that includes the first bore portion, the body and the first member between them configured to accommodate a landing/running string, and a second disposition, in which the body and the first member are spaced apart from each other such that the landing/running string can be received in or removed from the portion of the first bore defined in the body, the first fastener being operative to engage and lock the first member to the body, such that the first member securely retains and locks the landing/running string within the first bore in the first disposition of the first member; and
    the body and the second member pivotally attached and being rotatably movable in relation to each other between a first disposition, in which the body and the second member define a second bore that includes the second bore portion, the body and the second member between them configured to accommodate an umbilical, and a second disposition, in which the body and the second member are spaced apart from each other such that the umbilical can be received in or removed from the portion of the second bore defined in the body, the second fastener being operative to securely retain and lock the second member to the body, such that the second member securely clamps and retains the umbilical within the second bore in the first disposition of the second member.

2. An umbilical protector according to claim 1, in which the body and first member are movable between the first and second dispositions when the body and the second member are held in the first disposition by the second fastener and in which the body and second member are movable between the first and second dispositions when the body and the first member are held in the first disposition by the first fastener.

3. An umbilical protector according to claim 1, in which the first member being rotatable about a first axis and the second member being rotatable about a second axis, the first and second axes being spaced apart from each other in a direction substantially perpendicular to a longitudinal axis of the first bore.

4. An umbilical protector according to claim 3, in which the first and second axes are disposed on opposing sides of a longitudinal axis of the first bore.

5. An umbilical protector according to claim 3, in which a free edge of the first member and a free edge of the second member move in generally opposing directions.

6. An umbilical protector according to claim 1 further comprising a third member and a third fastener, the first member and the third member being movable in relation to each other between a first disposition, in which the first member and the third member define a further bore between them for accommodating a further umbilical, and a second disposition, in which the first member and the third member are spaced apart from each other such that the further umbilical can be received in or removed from the further bore, the third fastener being operative to hold the first member and the third member in the first disposition.

7. An umbilical protector according to claim 6, in which the first and third members are movable between the first and second dispositions when at least one of the first and second fasteners are operative to hold the body and a respective one of the first and second members in the first disposition.

8. An umbilical protector according to claim 1, in which the body and the first member define a further bore between them for accommodating a further umbilical, the further umbilical being accommodated in the further bore in the first disposition and the further umbilical being receivable in or removable from the further bore in the second disposition.

9. An umbilical protector according to claim 8, in which the body and the first member are rotatable in relation to each other and an axis of rotation of the body and the first member is substantially in line with a centre of the first bore and a centre of the further bore.

10. An umbilical protector according to claim 8, in which the umbilical protector has a substantially circular footprint when the umbilical protector is viewed by looking along the first bore.

11. An umbilical protector according to claim 10, in which a first part of umbilical protector defining one side of the first bore is substantially thicker than a second part defining an opposing side of the first bore.

12. An umbilical protector according to claim 11, in which at least one of the second bore and the further bore is defined in the first part of the umbilical protector.

13. An umbilical protector according to claim 1, in which the first bore is configured to grip a string.

14. An umbilical protector according to claim 1, in which the second bore having separate sections, continuously formed and configured to receive one of another umbilical and a cable in addition to an umbilical.

15. An umbilical protector according to claim 14, in which the second bore is configured to receive one of another umbilical and a cable of smaller diameter than the umbilical.

16. An umbilical protector according to claim 14, in which a main part of the second bore that is configured to receive the umbilical has a substantially circular footprint when umbilical protector is viewed by looking along the second bore and a secondary part of the second bore that is configured to receive the one of the other umbilical and the cable defines a channel formed in a side of the main part of the second bore.

17. An umbilical protector according to claim 1, in which the umbilical protector is formed at least in part of a sacrificial material.

* * * * *